United States Patent [19]
Hulse

[11] Patent Number: 5,812,714
[45] Date of Patent: Sep. 22, 1998

[54] OPTICAL WAVEGUIDE ELEMENTS FOR A DISTRIBUTED LIGHTING SYSTEM

[75] Inventor: George Robert Hulse, Cookeville, Tenn.

[73] Assignee: Cooper Industries, Inc., Houston, Tex.

[21] Appl. No.: 791,683

[22] Filed: Jan. 30, 1997

[51] Int. Cl.⁶ .................................................. G02B 6/26
[52] U.S. Cl. ........................ 385/39; 385/146; 385/147; 385/901
[58] Field of Search ................... 385/31, 39, 46, 385/146, 147, 901; 362/32

[56] References Cited

U.S. PATENT DOCUMENTS

| | | | |
|---|---|---|---|
| Re. 33,722 | 10/1991 | Scifres et al. .............................. | 385/33 |
| 2,507,909 | 5/1950 | Kaysen ....................................... | 362/32 |
| 3,683,167 | 8/1972 | Rishton ................................ | 385/147 X |
| 3,767,910 | 10/1973 | Harrigan .................................... | 362/32 |
| 3,832,028 | 8/1974 | Kapron ................................. | 385/147 X |
| 3,901,581 | 8/1975 | Thiel .................................... | 385/147 X |
| 3,962,702 | 6/1976 | Kriege ....................................... | 340/380 |
| 4,151,582 | 4/1979 | Grunberger ........................ | 385/901 X |
| 4,222,091 | 9/1980 | Bartenbach ................................. | 362/32 |
| 4,428,029 | 1/1984 | Baliozian .................................. | 362/12 |
| 4,767,172 | 8/1988 | Nichols et al. ...................... | 385/146 X |
| 4,824,194 | 4/1989 | Karasawa ............................ | 385/146 X |
| 4,883,333 | 11/1989 | Yanez .................................. | 385/147 X |
| 4,945,457 | 7/1990 | Yazdani et al. .......................... | 362/101 |
| 5,042,892 | 8/1991 | Chiu et al. .......................... | 385/901 X |
| 5,053,765 | 10/1991 | Sonehara et al. ................... | 340/815.31 |
| 5,058,985 | 10/1991 | Davenport et al. ..................... | 385/115 |
| 5,199,091 | 3/1993 | Davenport et al. ........................ | 385/39 |
| 5,341,445 | 8/1994 | Davenport et al. ........................ | 385/39 |
| 5,343,367 | 8/1994 | Davenport et al. ........................ | 362/32 |
| 5,363,469 | 11/1994 | Elderfield ................................ | 385/146 |
| 5,436,805 | 7/1995 | Hsu et al. ................................. | 362/32 |
| 5,559,911 | 9/1996 | Forkner et al. ........................... | 385/33 |
| 5,560,699 | 10/1996 | Davenport et al. ....................... | 362/32 |
| 5,584,558 | 12/1996 | Nath ......................................... | 362/32 |
| 5,640,483 | 6/1997 | Lin ........................................... | 385/146 |
| 5,664,863 | 9/1997 | Cassarly et al. .......................... | 362/32 |
| 5,675,677 | 10/1997 | Davenport et al. ....................... | 385/31 |

OTHER PUBLICATIONS

Hulse et al., "Three Specific Design Issues Associated with Automotive Distributed Lighting Systems; Size Efficiency, and Reliability," SAE Technical Paper Series 960492, SAE International, International Congress & Exposition, Detroit, Michigan, Feb. 26–29, 1996, pp.1–7.

*Primary Examiner*—Brian Healy
*Attorney, Agent, or Firm*—Fish & Richardson PC

[57] ABSTRACT

An optical waveguide bend element is configured to change a direction of travel of light from a first direction to a second direction. The bend element includes a block of material. The block has an input face configured to receive light travelling in the first direction and an output face configured to transmit light travelling in the second direction. The second direction is substantially different from the first direction. The block also has a convex surface defined between the input face and the output face. The convex surface is configured to keep the light within the bend element through total internal reflection.

23 Claims, 13 Drawing Sheets

OPTICAL WAVEGUIDE ELEMENTS FOR A DISTRIBUTED LIGHTING SYSTEM

CROSS REFERENCE TO RELATED APPLICATIONS

This application is related to U.S. application Ser. No. 08/697,930, pending, filed Sep. 3, 1996 and entitled "Distributed Lighting System", which is incorporated herein by reference.

BACKGROUND OF THE INVENTION

The invention relates to optical waveguide elements for use in a distributed lighting system.

Optical fibers have been used as optical waveguide elements in distributed lighting systems. Optical fibers are flexible and may be bent around turns. Optical bend elements with mirrors have been used with collimated light sources such as lasers.

SUMMARY OF THE INVENTION

In one aspect, generally, the invention features an optical waveguide bend element configured to change the direction of travel of light from a first direction to a second direction, comprising a block of material. The block has an input face configured to receive light travelling in the first direction, and an output face configured to transmit light travelling in the second direction. The second direction is substantially different from the first direction. The block also includes a convex surface defined between the input face and the output face. The convex surface is configured to keep the light within the bend element through total internal reflection.

The optical waveguide bend element can be used in a distributed lighting system to bend light with a tight turning radius. This permits the waveguide element to be quite compact, which is particularly important in applications in which space is at a premium, such as in the engine compartment of a vehicle. By contrast, bending optical fibers in a tight turning radius will increase light loss and can cause damage to the fibers.

Embodiments of the waveguide bend element may include one or more of the following features. The block may have a portion that is bypassed by light passing through the bend element. A mounting fixture may be attached to this portion of the block. The block may be composed of solid acrylic. The input face, output face and convex surface of the bend element may form interfaces between the material and air surrounding the bend element. The input face of the bend element may be substantially perpendicular to the output face. The convex surface of the bend element may include several bevelled surfaces.

The block may have two parallel planar side surfaces, with the input face and the output face being disposed between the side surfaces and perpendicular to the side surfaces. The convex surface may include multiple surfaces disposed between and perpendicular to the side surfaces.

The block may have curved surfaces defined between the input face and the output face and configured to keep the light within the bend element through total internal reflection. The radius of curvature of the first surface may be greater than the radius of curvature of the second surface, and the center of curvature of the first curved surface may be offset from the center of curvature of the second curved surface.

In another aspect, the invention features an optical waveguide collector element configured to concentrate light from a light source and made from a block of material. The block has an input face configured to receive light from a light source and an output face configured to transmit light. The output face subtends a smaller azimuthal angle relative to the light source that the input face.

The optical waveguide collector element can be used in a distributed lighting system to concentrate light from a high intensity light source and direct it to an optical conduit, such as a bundle of optical fibers or a bend element. The collector element increases the efficiency of the distributed lighting system by receiving light emitted over a wide azimuthal angle and transmitting it to an optical conduit covering a smaller azimuthal angle. This allows a high percentage of the light emitted by the light source to be directed into the optical conduit.

Embodiments of the waveguide collector element may include one or more of the following features. The optical waveguide collector element may have convex surfaces defined between the input face and the output face. The convex surfaces may be configured to keep the light within the collector element through total internal reflection. The optical waveguide collector element may be composed of solid acrylic. The input face, output face and convex surfaces of the collector element may form interfaces between the material and air surrounding the collector element.

Other features and advantages of the invention will be apparent from the following detailed description, including the drawings, and from the claims.

DESCRIPTION OF THE PREFERRED EMBODIMENTS

Figure 1:
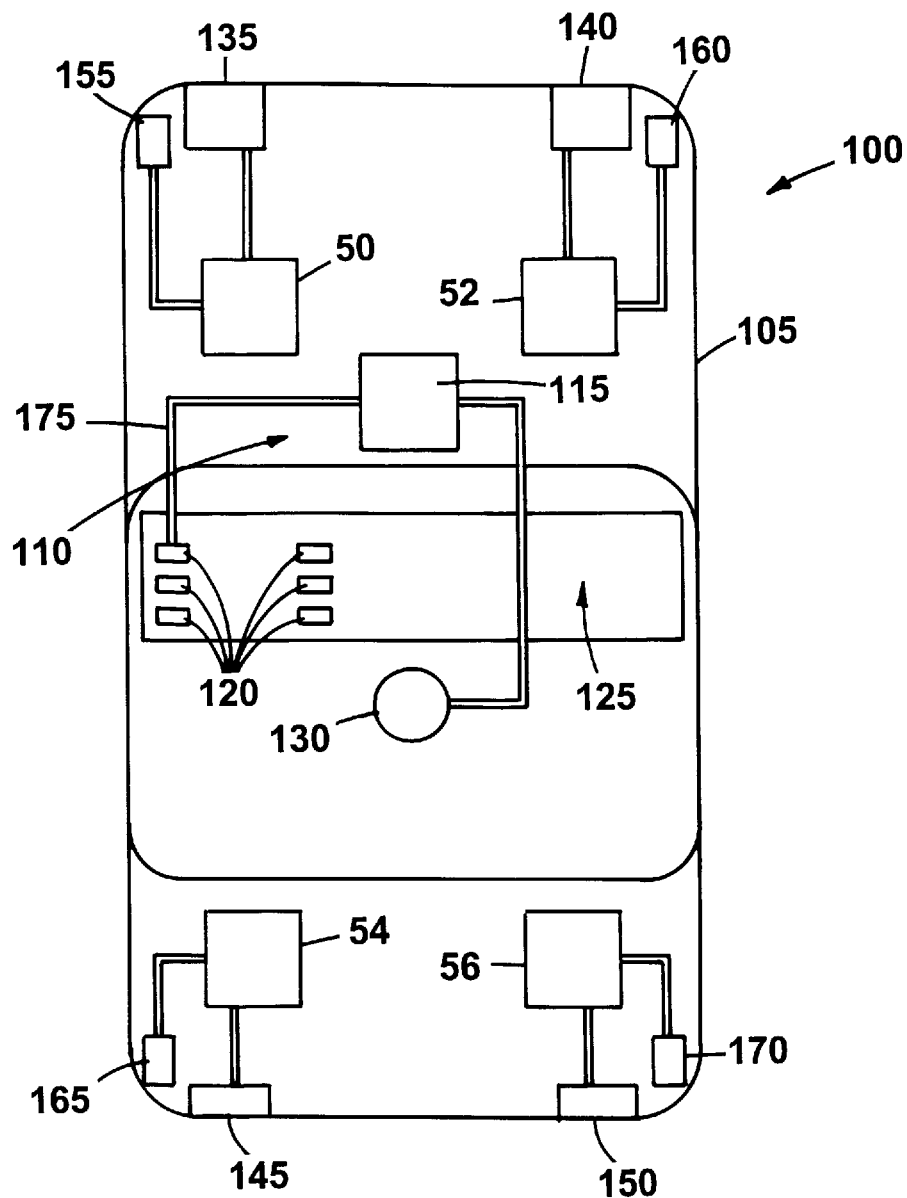
FIG. 1 is a block diagram showing orientation of components of a distributed lighting system in an automobile.

Referring to FIG. 1, a distributed lighting system (DLS) 100 may be installed in an automobile 105. The DLS may include several subsystems 110. Each subsystem distributes light from a light source, such as a high-intensity discharge (HID) lamp assembly 115, to one or more light emitters of the automobile. Light emitters include, for example, indicator lights 120 on the dashboard panel 125 of the automobile and cabin dome lights 130. Other subsystems of the DLS may distribute light to exterior light emitters such as head lights 135, 140; tail lights 145, 150; and turn signals 155, 160, 165, and 170. As shown, the DLS includes several independent subsystems 110, each of which is connected to a subset of the vehicle's lights and includes a separate light source. The DLS also may be implemented using only a single light source.

Each subsystem 110 may include a HID lamp assembly 115 and optical conduits 175 that transmit light from the lamp assembly 115 to the light emitters. An optical conduit 175 may be, for example, a plastic or glass waveguide or a plastic or glass optical fiber bundle. One suitable plastic fiber is large core, plastic optical fiber having a three millimeter diameter and covered with a half millimeter protective jacket. An optical conduit also may include a glass or quartz rod having a first end adjacent to a lamp of the lamp assembly and a second end connected to a glass or plastic optical fiber.

Figure 2:
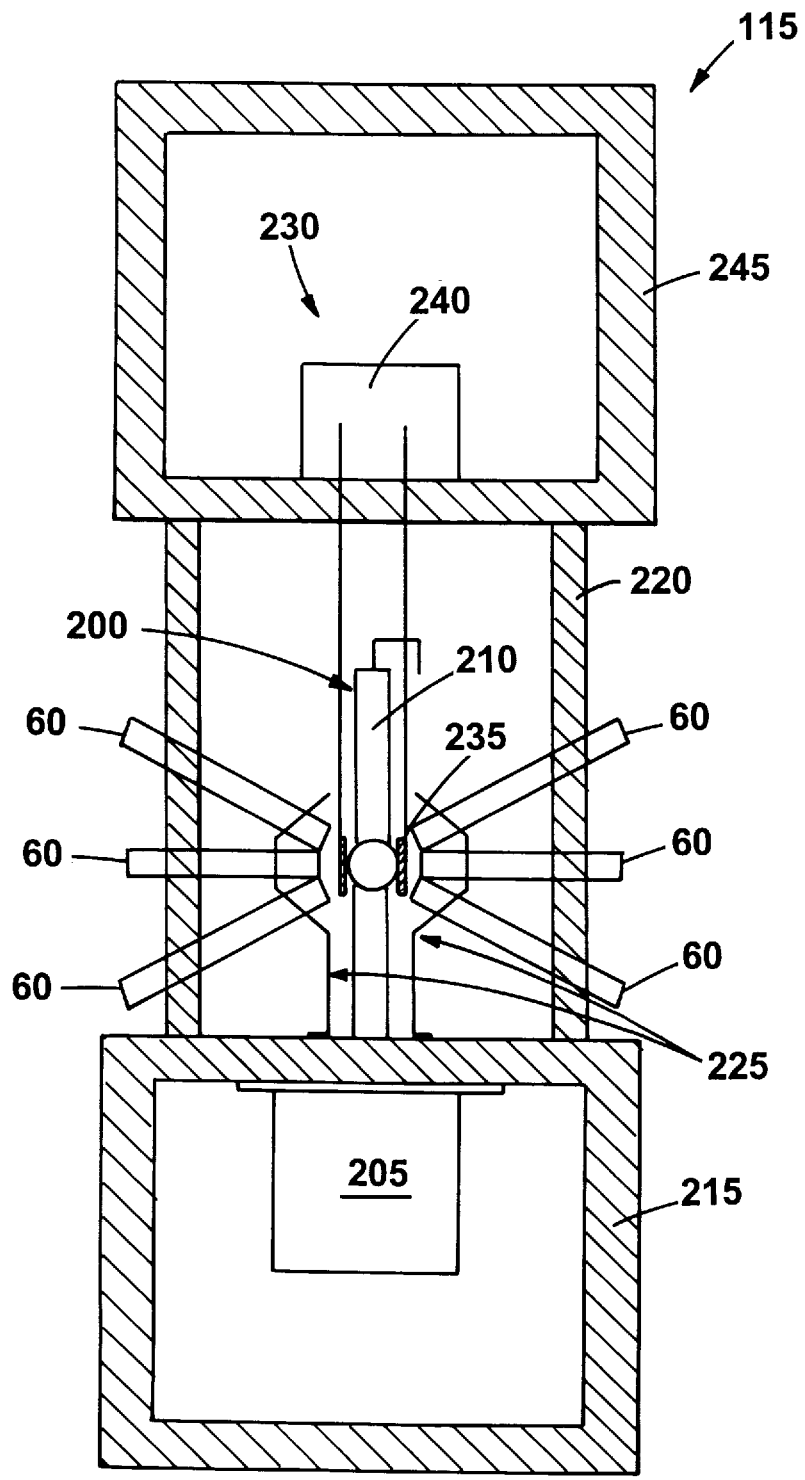
FIG. 2 is a block diagram of a lamp assembly of the distributed lighting system of FIG. 1.

FIG. 2 illustrates an implementation of a high-intensity discharge (HID) lamp assembly 115 as a light source in a DLS. The assembly 115 includes a HID lamp 200 having a base 205 and a bulb 210. The base is mounted in a housing 215, and the bulb 210 is enclosed by a housing 220.

The HID lamp 200 is surrounded by optical conduits 60. A fixture 225 holds the optical conduits in place, with an end of each optical conduit close to the bulb 210. In most instances, the ends of the optical conduits are within one to five millimeters from the bulb to increase the efficiency with which the conduits collect light emitted by the bulb. The ends of the optical conduits may contact each other. Due to the proximity of the ends of the optical conduits to the bulb, and the heat associated with the bulb, the optical conduits are implemented using glass rods having optical fibers or waveguides connected to the ends that are not positioned next to the bulb. Glass optical fibers or waveguides, or heat resistant plastic optical fibers or waveguides, also may be used.

The lamp assembly 115 also includes a mechanism 230 that controls whether light enters particular ones of the optical conduits 60. The mechanism 230 includes an array 235 of electromechanical shutters. A shutter corresponding to a particular optical conduit may be selectively opened or closed to control whether light enters the optical conduit. The shutters are controlled by solenoids 240 positioned in a housing 245 of the lamp assembly 115.

Figure 5:
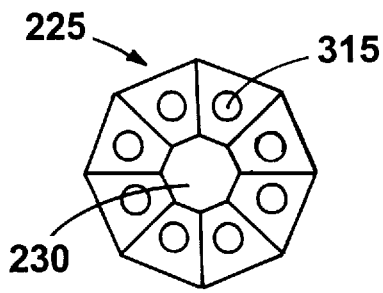
FIGS. 3–5 are views of a fixture of the lamp assembly of FIG. 2.
Figure 4:
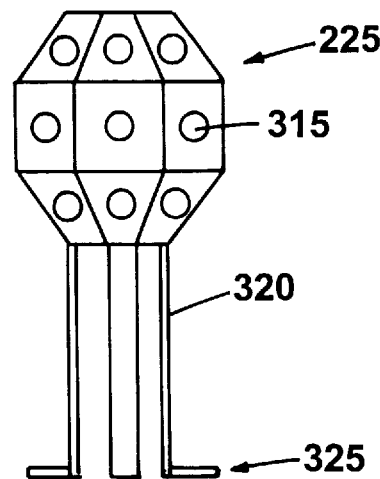
Figure 3:
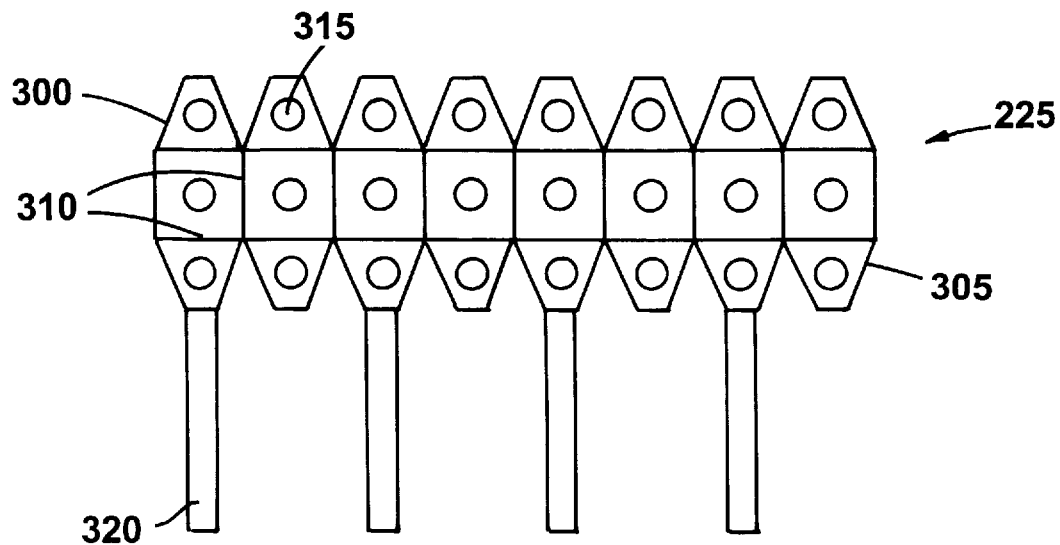

Referring also to FIGS. 3–5, the fixture 225 is formed from a sheet 300 of heat-resistant material, such as aluminum. The sheet is cut to have a desired outline 305. Thereafter, the sheet is folded along fold lines 310 to form the fixture 225. The fixture includes twenty-four holes 315, each of which is located on a side of the fixture and accommodates an optical conduit.

Four extensions 320 project from the bottom of the fixture 225 and are folded at their ends to form a pedestal 325. The pedestal 325 is used to attach the fixture 225 to the base 215 of the HID lamp 200. As shown in FIG. 5, the fixture 225 has an opening 230 at its top that permits the bulb of the HID lamp to extend out of the fixture. The opening 230 also permits insertion of the electro-mechanical shutters into the fixture 225.

Figure 6:
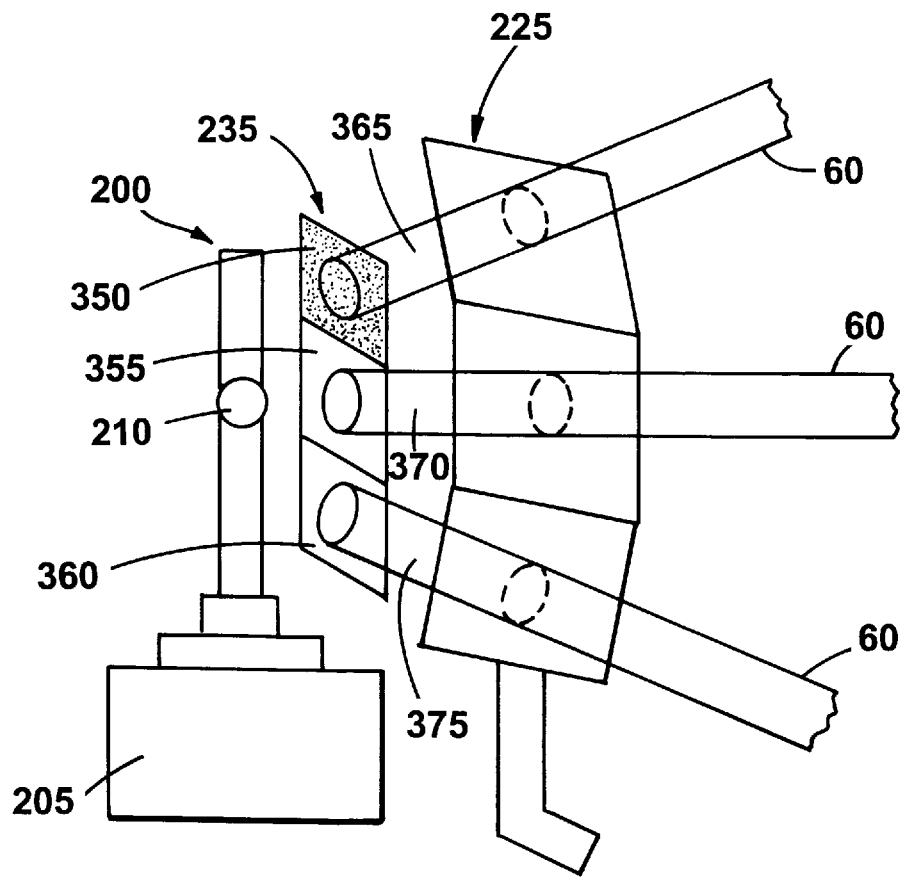
FIG. 6 is a block diagram illustrating operation of shutters of the assembly of FIG. 2.

FIG. 6 illustrates operation of the array 235 of electro-mechanical shutters. For ease of illustration, FIG. 6 shows three shutters 350, 355 and 360 that may be used to selectively control whether light produced by the HID lamp 200 enters associated optical conduits 365, 370 or 375. Actual implementations may include more shutters. For example, a typical automobile may require from 30 to 50 separately controlled optical conduits to provide interior lighting and about 13 optical conduits to provide exterior lighting.

The shutters are located at ends of the optical conduits closest to the HID lamp. This shutter position permits the optical conduits to be continuous, without any need for cutting or splicing optical conduits to install the shutter array. The shutter 350 is shown in the closed or "off" position. In this position, the shutter 350 prevents light from reaching the optical conduit 365. Shutters 355 and 360 are shown in the open or "on" position so that light passes through the shutters and reaches the optical conduits 370 and 375.

Figure 7:
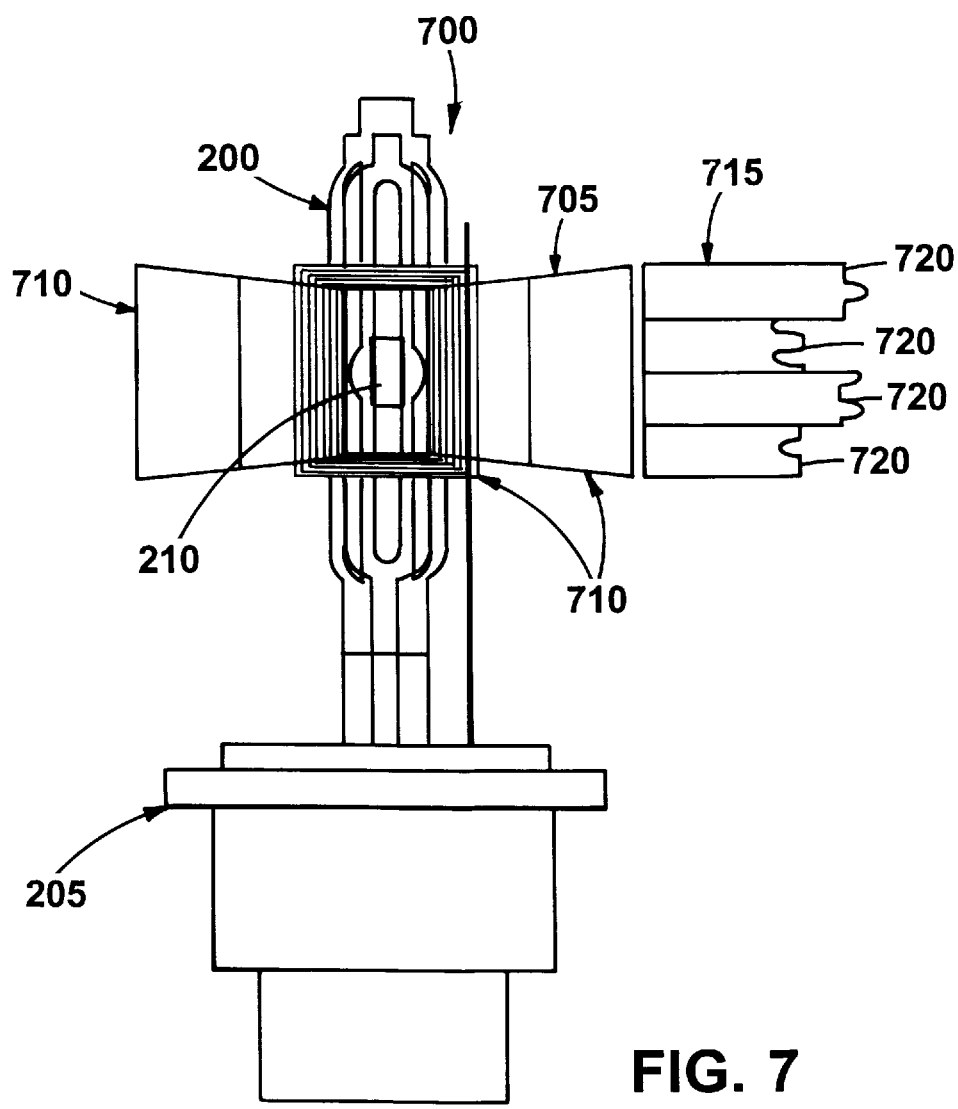
FIGS. 7 and 8 are side and top views of a lamp assembly.
Figure 8:
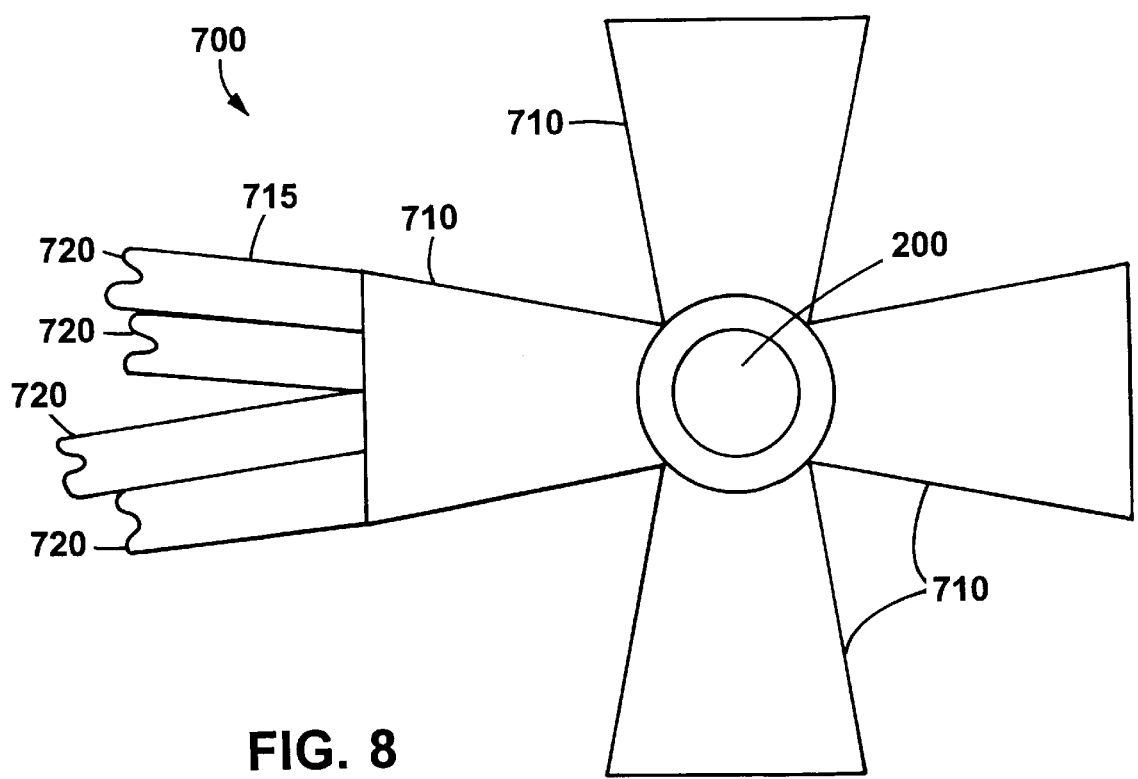

FIGS. 7 and 8 show another HID lamp assembly 700. Like the assembly 115, the assembly 700 includes a HID lamp 200 having a base 205 and a bulb 210. The HID lamp 200 provides light to an optics assembly 705. The optics assembly 705 includes four light collecting tubes 710. Each light collecting tube has a rectangular cross section that increases in size with increasing distance from the end closest to the HID lamp. Light collecting tubes having circular or other cross sections also could be used. A light collecting tube may be implemented using a hollow tube or a solid piece of glass or high temperature plastic, such as the optical waveguide collector element discussed below. Interior surfaces of the light collecting tube are polished or covered with reflective material.

A light collecting tube directs light emitted by the lamp to a bundle 715 of optical conduits 720 positioned at the end of the tube that is furthest from the lamp. In addition to collecting the light, the light collecting tube changes the angle of the light so that the light meets the acceptance angle of the conduit.

Figure 9:
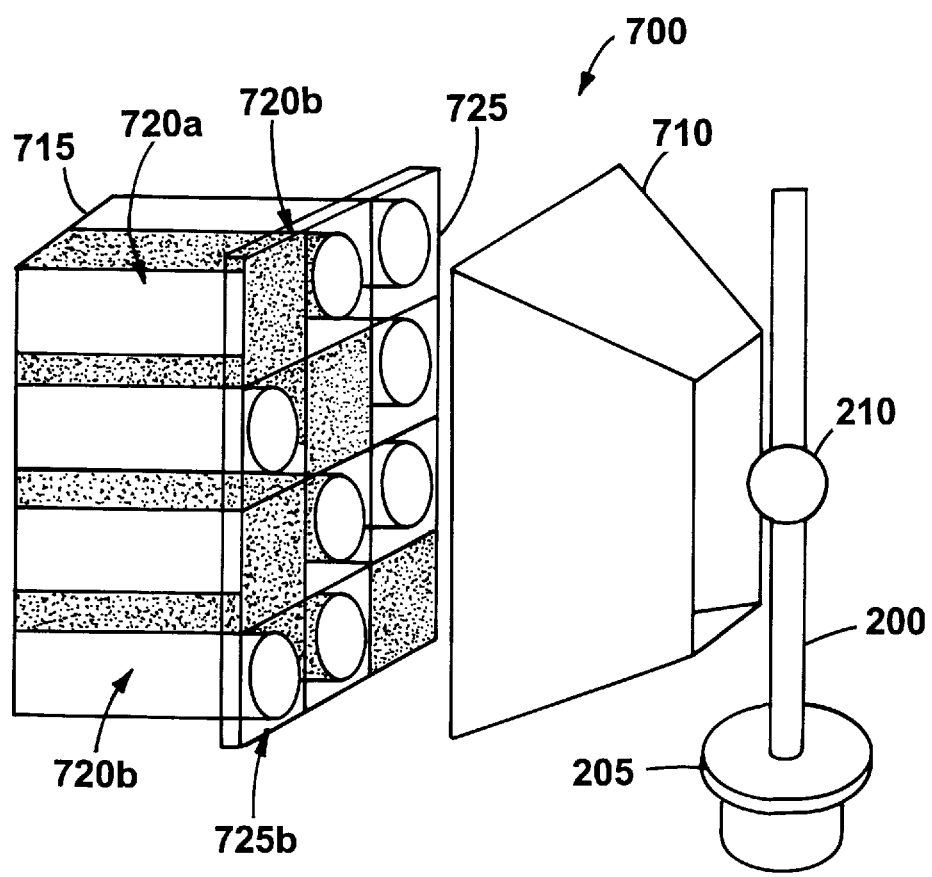
FIG. 9 is a block diagram illustrating operation of light controllers of the assembly of FIGS. 7 and 8.

Referring to FIG. 9, each light collecting tube 710 of the assembly 700 includes an array of liquid crystal light valves (LCLVs) 725 that modulate the light emitted by the HID lamp 200. The LCLVs 725 are located between the light collecting tube 710 and the bundle 715 of optical conduits 720. The LCLVs may be, for example, twisted nematic LCLVs. This type of LCLV is light-absorbing and is regularly used in applications such as wrist watch displays.

An LCLV 725*a* is shown in the closed or "off" mode. In this mode, the LCLV is nearly opaque and prevents most light from entering a corresponding optical conduit 720*a*. An LCLV 725*b* is shown in the open or "on" mode, in which the LCLV allows light to pass through the LCLV and enter a corresponding optical conduit 720*b*.

Figure 10A:
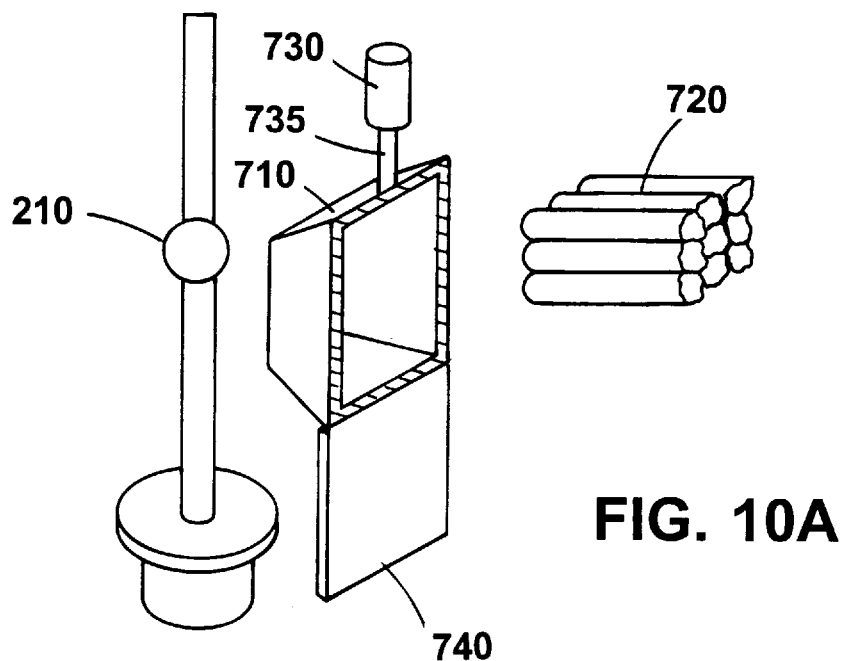
FIGS. 10A and 10B are perspective views illustrating operation of an alternative light controller for the assembly of FIGS. 7 and 8.
Figure 10B:
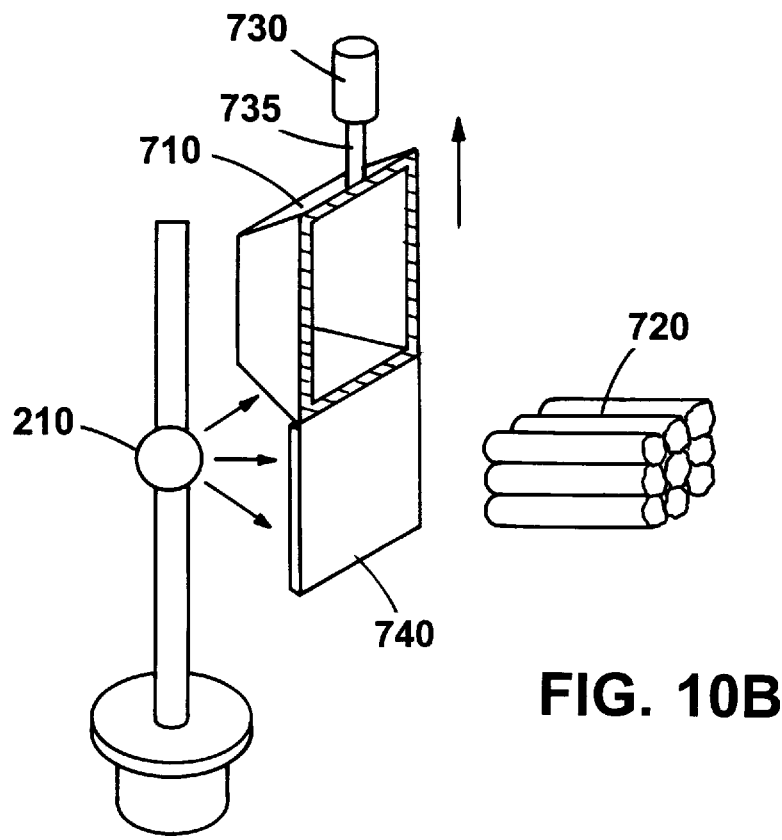

Referring to FIGS. 10A and 10B, an alternative modulation arrangement includes a device 730, such as a solenoid, connected to a light collecting tube 710 by a rod 735. A shutter 740 extends from the bottom of the light collecting tube 710. As shown in FIG. 10A, in a first configuration, the light collecting tube 710 is positioned between the bulb 210 and the optical conduits 720. In this configuration, the light collecting tube 710 directs light from the bulb 210 into the optical conduits 720.

When it is desired to prevent light from reaching the optical conduits 720, the device 730 is activated to move the light collecting tube 710 and the shutter 740 to the configuration shown in FIG. 10B. In this configuration, the light collecting tube 710 is no longer aligned with the optical conduits 720. Instead, the shutter 740 is positioned between the bulb 210 and the optical conduits 720. The shutter 740 is opaque and prevents light from reaching the optical conduits 720.

Figure 11:
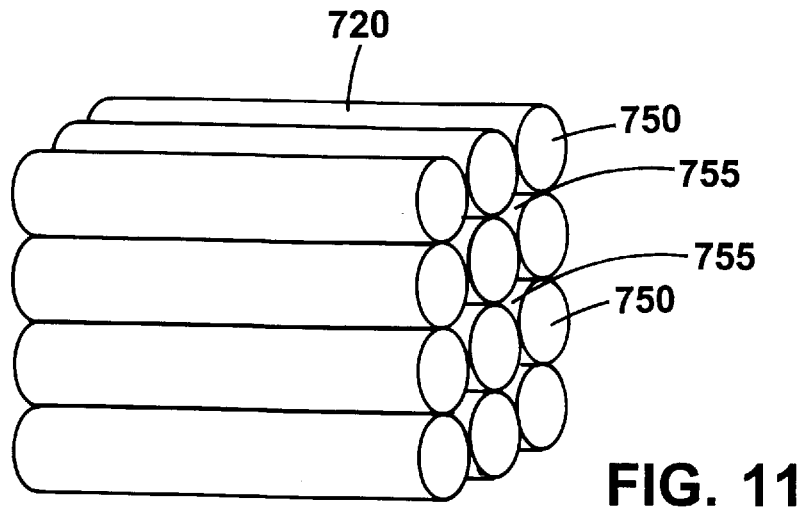
FIGS. 11 and 12 are perspective views of optical conduit ends.
Figure 12:
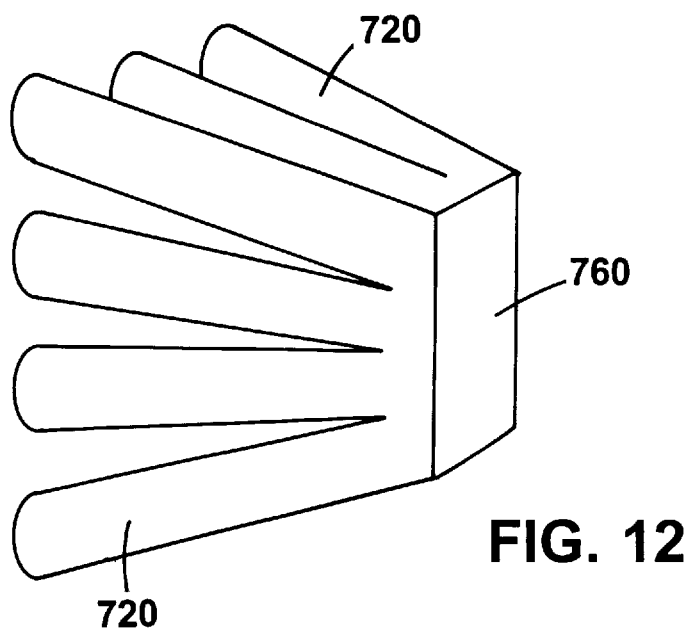

The optical conduits 720 may have generally circular cross-sections or may have other shapes. FIG. 11 shows a set of optical conduits placed next to each other. In this configuration, ends 750 of the optical conduits do not form a solid planar surface. Instead, gaps 755 are located between the conduits. Accordingly, a portion of the light emitted by the HID lamp (FIG. 7) passes into the gaps and is lost. As shown in FIG. 12, the ends 750 of the optical conduits 720 may be fused together to form a solid planar surface 760 that eliminates the gaps (FIG. 11) between the optical conduits and improves the light collecting efficiency thereof.

Figure 13:
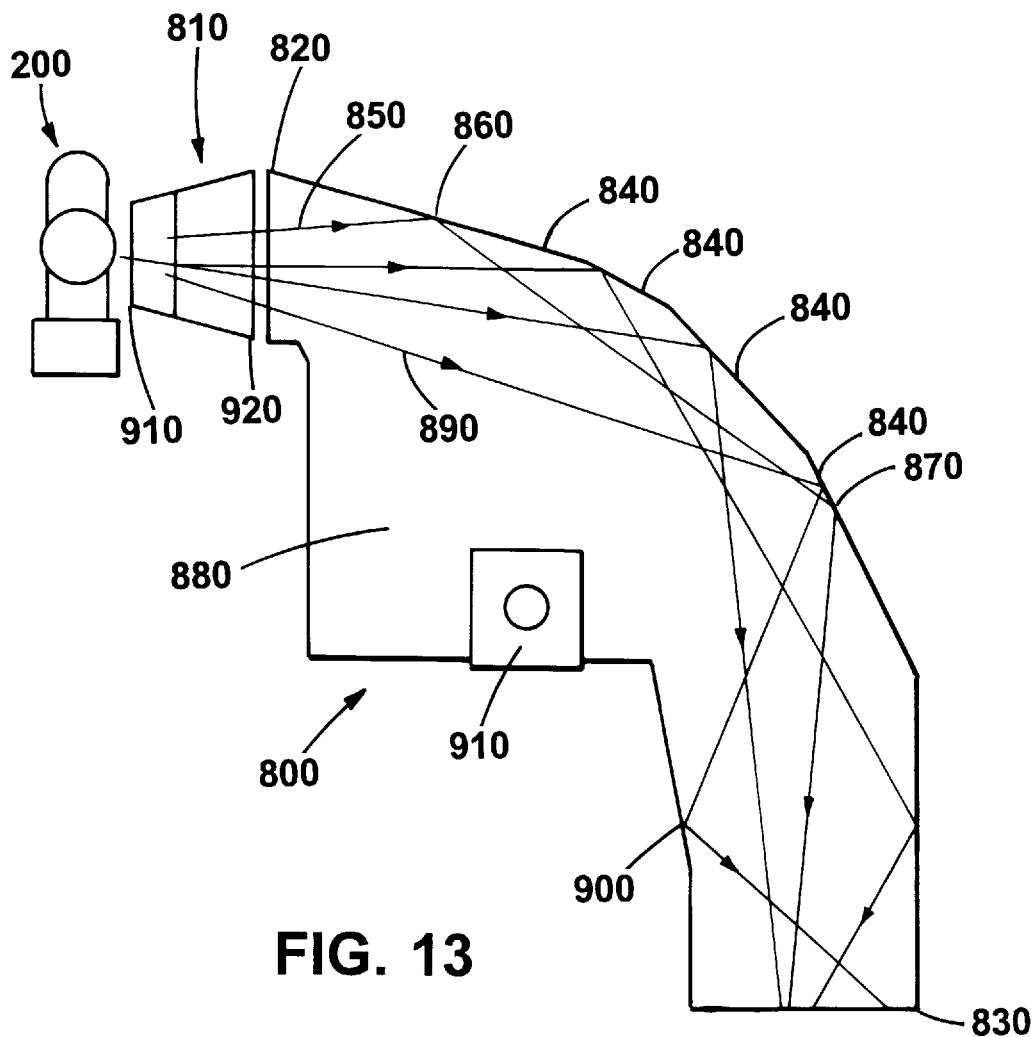
FIG. 13 is a side view of a waveguide collector element and a waveguide bend element in conjunction with a lamp.

Referring to FIG. 13, an alternative embodiment of the DLS may include optical waveguide elements, such as a bend element 800 or a collector element 810. The collector element 810 is placed in close proximity to the HID lamp 200 to collect the light emitted from the lamp and direct the light to the bend element 800. The bend element 800 guides light through tight turns in interior spaces of the vehicle where space is at a premium, such as the engine compartment. The bend element 800 provides a smaller turning radius than is provided by optical fibers, which may be damaged when bent in a small turning radius. The output of the bend element 800 may be connected to a bundle of optical fibers that are connected to the light emitters of a vehicle as described above. Light enters the bend element 800 through an input face 820 and is reflected internally until the light reaches an output face 830. In the illustrated embodiment, the output face 830 forms an angle of 90° with the input face 820. Other angles also could be provided.

Figure 14:
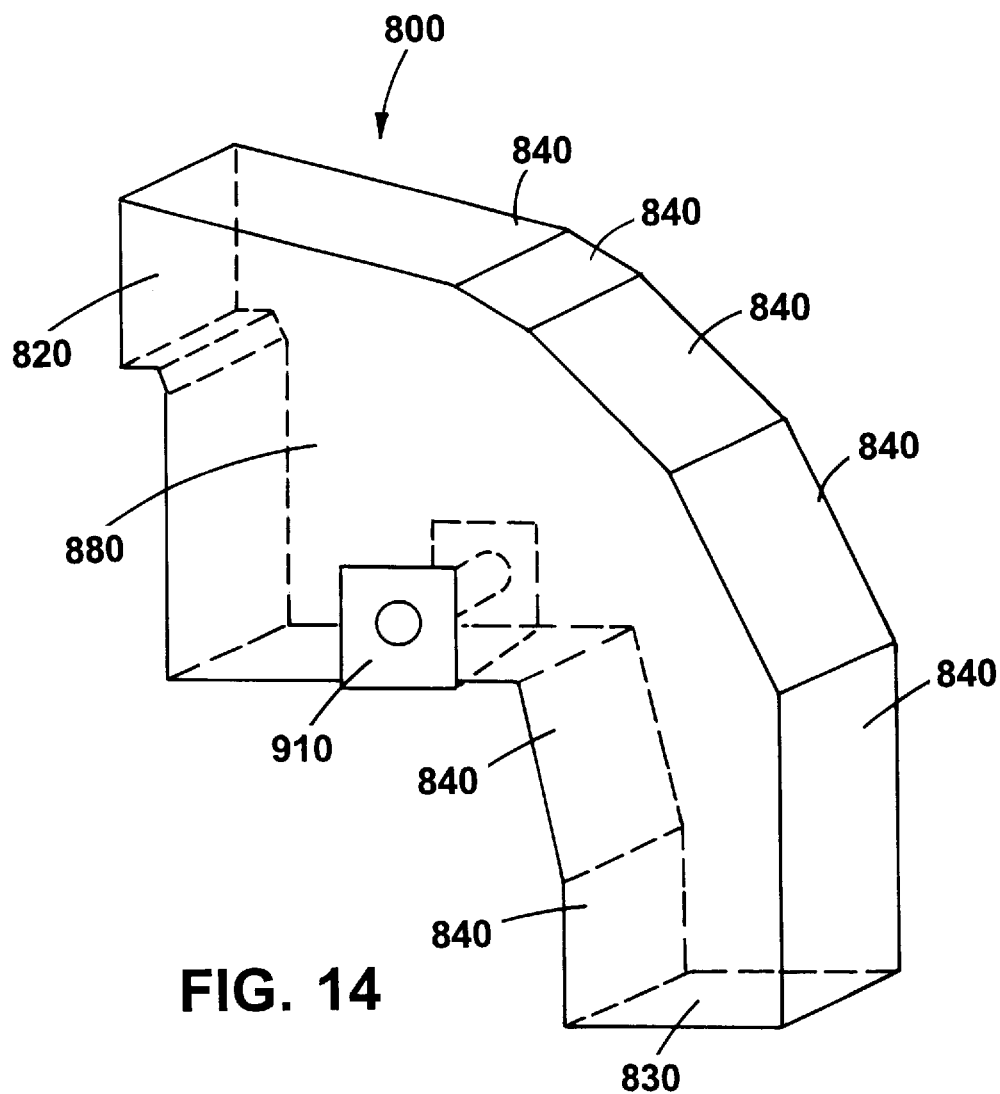
FIG. 14 is a perspective view of the waveguide bend element of FIG. 13.

Referring also to FIG. 14, the bend may be formed of solid glass or plastic material, such as acrylic, and may have bevelled angular surfaces 840. An acrylic bend can be easily and inexpensively manufactured by injection molding. The outer surface 860 of the bend element forms an interface between the material and air, although other materials with appropriate optical characteristics may surround the bend element. The inside corner region 880 of the bend element 800 is essentially bypassed by the light rays, which allows the bend to be mounted to a fixture 910 without disturbing the optical characteristics of the bend.

Referring further to FIG. 13, a light ray 850 entering the input face 820 proceeds through the bend element 800 until the light ray reaches an outer surface 860 of the bend element, which in this embodiment is an interface between the material of the bend element 800 and air. At the outer surface 860, light is reflected in accordance with Snell's law. If the angle of incidence of the light ray 850 at the outer surface 860 is less than a threshold referred to as the critical angle, then the light ray is reflected internally, with no light escaping. This phenomenon is known as total internal reflection. The critical angle depends on the index of refraction of the material of which the bend element is composed relative to that of the material surrounding the bend element. For example, if the bend element were made from acrylic, which has an index of refraction of approximately 1.5, and surrounded by air, the critical angle, $\theta_c$, would be:

$$\theta_c = \arcsin(n_a / n_b) = \arcsin(1 / 1.5) = 41.8°$$

where $n_a$ is the index of refraction of air (1.0) and $n_b$ is the index of refraction of acrylic (1.5).

Bevelled angular surfaces 840 of the bend element are oriented so that most of the light entering the bend element 800 is internally reflected until the light reaches the output face 830. For example, a light ray 850 entering the input face with an angular direction of +8° relative to horizontal (the horizontal plane being perpendicular to the input face) reaches an outer surface 860 that is inclined at an angle of −15° relative to horizontal. The angle of incidence of the light ray 850 on the outer surface 860 is 23°, which is less than the critical angle of 42°, and the light ray is reflected internally. Since, the angle of reflection is equal to the angle of incidence, the light ray 850 reflects from the outer surface 860 at an angular direction of −38° relative to horizontal. The light ray 850 continues through the bend element until it reaches a second outer surface 870 that is inclined at an angle of −65° relative to horizontal. The angle of incidence at the second surface 870 is 27° (the absolute value of −65 minus −38). Accordingly, the light ray 850 is reflected at an angle of −92° relative to horizontal. The light ray 850 continues through the bend element until it reaches the output face 830. The angle of incidence of the light ray 850 at the output face is 88° which is greater that the critical angle, therefore the light ray 850 passes through the output face rather than being reflected.

In another example, a light ray 890 entering the input face with an angular direction of −24° relative to horizontal reaches an outer surface 870 that is inclined at an angle of −65° relative to horizontal. Since, the angle of incidence of the light ray 890 on the outer surface 870 is 41°, which is less than the critical angle of 42°, the light ray will be reflected internally. The light ray 890 reflects from the outer surface 870 at an angular direction of −106° relative to horizontal. The light ray 890 continues through the bend element until it reaches a second outer surface 900 that is inclined at an angle of −77° relative to horizontal. The angle of incidence at the second surface 900 is 29°. Accordingly, the light ray 890 is reflected at an angle of −48° relative to horizontal. The light ray 890 continues through the bend element until it reaches the output face 830. The angle of incidence of the light ray 890 at the output face is 48°, which is greater than the critical angle, therefore the light ray 890 passes through the output face rather than being reflected.

Figure 15:
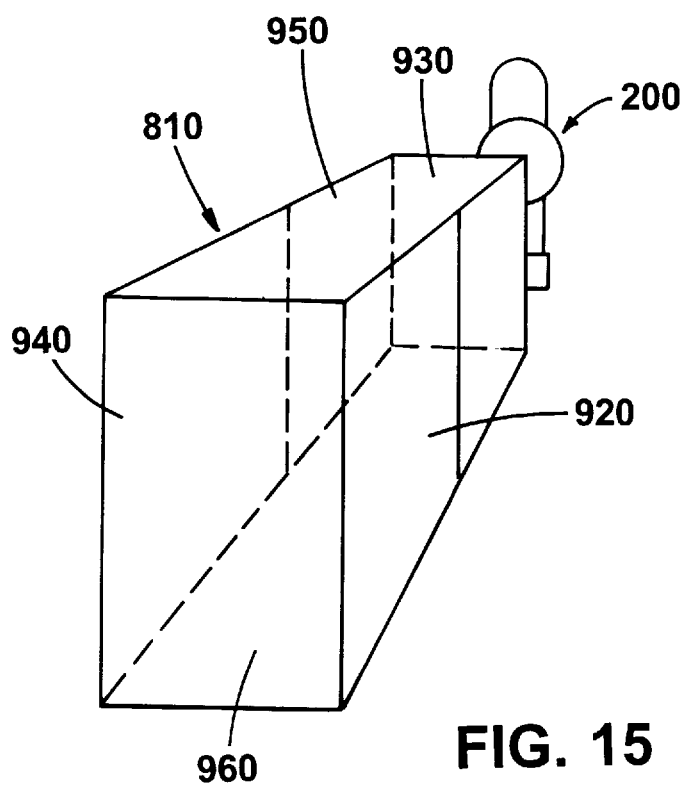
FIG. 15 is a perspective view of the collector element of FIG. 13.

Referring also to FIG. 15, the collector element 810 may also be formed of solid glass or plastic and functions in a manner similar to the bend element 800. The sides 920 of the collector element 810 may be bevelled and are oriented so that most of the light entering the input face 930 either passes directly through to the output face 940 or is internally reflected until reaching the output face 940. The planar top 950 and bottom 960 surfaces may be sloped to allow reflection of light rays that enter the collector element 810 at larger angles relative to horizontal.

The amount of light energy entering a collector element 810 depends, in part, on the azimuthal and zenith angles relative to the light source that are subtended by the input face of the collector element. For example, if a light source is surrounded by four collector elements in a manner similar to that illustrated in FIG. 8, each input face 930 subtends an azimuthal angle of 90°. Each collector element receives one-fourth of the total light energy collected from the light source (excluding losses, such as surface losses, hot mirror losses, etc.). The collector element concentrates the light energy received through the input face through total internal reflection as described above with respect to the bend element. The optical conduit connected to the output face 940 of the collector element therefore receives approximately one-fourth of the light energy collected from the light source even though the output face 940 of the collector element subtends an azimuthal angle of less than 90°. The use of collector elements allows a significant portion of the light energy from the light source to be directed into optical conduits without the necessity of placing the optical conduits in immediate proximity to the light source. This is an important advantage when heat-sensitive components, such as LCLVs 725 are positioned at the input of the optical conduit.

Figure 16:
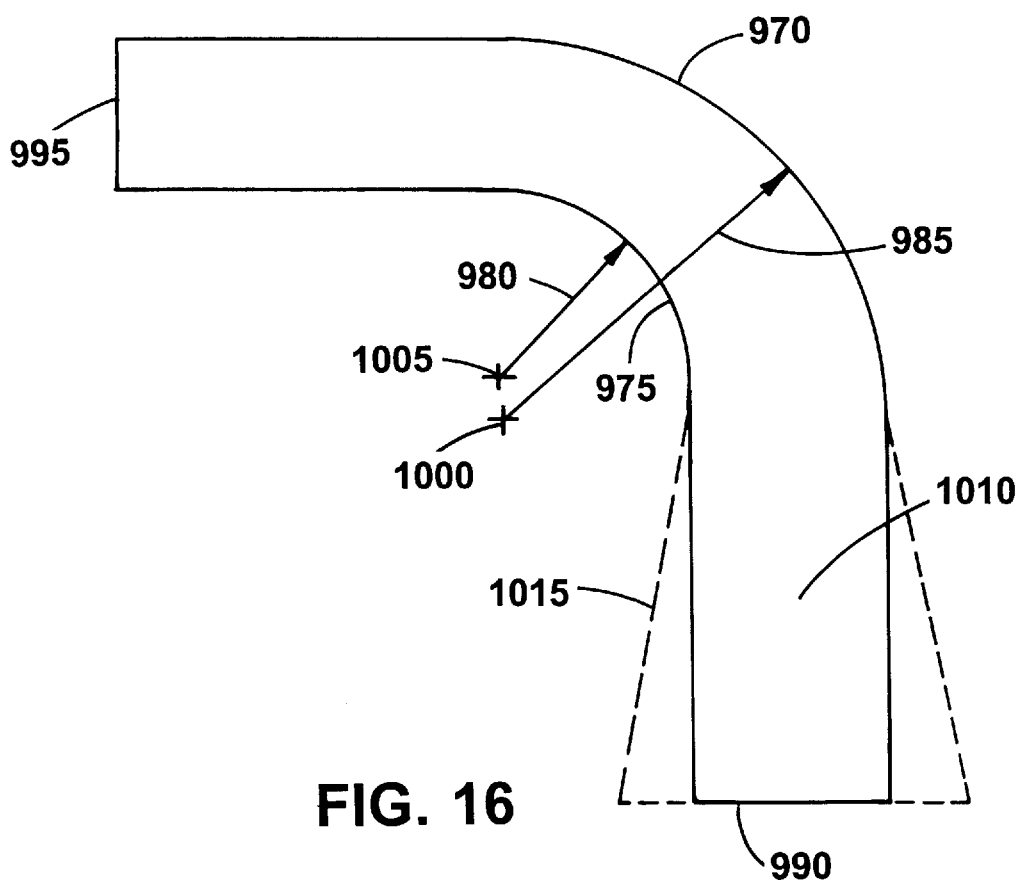
FIG. 16 is a side view of a waveguide bend element with curved surfaces.

FIG. 16 shows another embodiment of the bend element. Instead of beveled angular surfaces, there is an outer curved surface 970 and an inner curved surface 975. The radius of curvature 980 of the inner curved surface is, in general, smaller than the radius of curvature 985 of the outer curved surface 985. The curved surfaces are configured to internally reflect light entering the input face 995 until the light reaches the output face 990 in a manner similar to that described above with respect to the faceted surfaces 840. The curved surfaces constitute, in effect, an infinite number of faceted surfaces (i.e., as the number of faceted surfaces 840 increases, their area decreases and the properties of the bend approach those of a smooth curve).

The center of curvature 1000 of the outer curved surface may be offset from the center of curvature 1005 of the inner curved surface. Such an offset leads to an output face 990 that has a larger area than the input face 995. As an alternative to or in addition to offsetting the centers of curvature, the output arm 1010 may be flared to a trapezoidal shape as shown by the dashed lines 1015 in FIG. 16, further increasing the area of the output face 990. Widening the output arm may enable connection of the output face 990 directly to a bundle of fiber optic cables without the need for a collector element.

Other embodiments are within the scope of the following claims.

What is claimed is:

1. An optical waveguide bend element configured to change a direction of travel of light from a first direction to a second direction, comprising a block of material having:
   two side surfaces,
   an input face disposed between the side surfaces and configured to receive light travelling in the first direction,
   an output face disposed between the side surfaces and configured to transmit light travelling in the second direction, the second direction being substantially different from the first direction,
   a top surface disposed between the side surfaces and adjacent to the input surface,
   a back surface disposed between the side surfaces and adjacent to the output surface, and
   a convex surface defined between the top surface and the back surface, wherein the convex surface is configured to keep the light within the bend element through total internal reflection.

2. The optical waveguide bend element of claim 1, wherein the block further comprises a portion that is bypassed by light passing through the bend element.

3. The optical waveguide bend element of claim 2, further comprising a mounting fixture attached to the portion of the block that is bypassed by light passing through the bend element.

4. The optical waveguide bend element of claim 1, wherein the material comprises solid acrylic.

5. The optical waveguide bend element of claim 1, wherein the input face, output face and convex surface of the bend element form interfaces between the material and air surrounding the bend element.

6. The optical waveguide bend element of claim 1, wherein the input face is substantially perpendicular to the output face.

7. The optical waveguide bend element of claim 1, wherein the convex surface comprises a plurality of bevelled surfaces.

8. The optical waveguide bend element of claim 1, wherein the convex surface comprises a curved surface.

9. The optical waveguide element of claim 1, wherein:
   the input face is perpendicular to the side surfaces,
   the convex surface comprises a plurality of outer surfaces disposed between the side surfaces and perpendicular to the side surfaces, and
   the output face is perpendicular to the side surfaces.

10. A distributed lighting system including the optical waveguide bend element of claim 1, the distributed lighting system further comprising optical conduits having input ends and emission ends, wherein the input ends of the optical conduits are abutted to the output face of the bend element.

11. A distributed lighting system, comprising:
   an optical waveguide bend element configured to change a direction of travel of light from a first direction to a second direction, the bend element comprising a block of material having:
      an input face configured to receive light travelling in the first direction,
      an output face configured to transmit light travelling in the second direction, the second direction being substantially different from the first direction, and
      a convex surface defined between the input face and the output face, wherein the convex surface is configured to keep the light within the bend element through total internal reflection;
   an optical waveguide collector element configured to concentrate light from a light source, the optical waveguide collector element comprising a block of material having:
      an input face configured to receive light from a light source, and
      an output face configured to transmit light, wherein the output face subtends an azimuthal angle relative to the light source that is smaller than an azimuth angle subtended by the input face; and
   optical conduits having input ends and emission ends, wherein the input ends of the optical conduits are abutted to the output face of the bend element.

12. An optical waveguide collector element configured to concentrate light from a light source, comprising a block of material having:
   an input face configured to receive light from a light source, and
   an output face configured to transmit light, wherein the output face subtends an azimuthal angle relative to the light source that is smaller than an azimuth angle subtended by the input face.

13. The optical waveguide collector element of claim 12, further comprising a plurality of convex surfaces defined between the input face and the output face, wherein the convex surfaces are configured to keep the light within the collector element through total internal reflection.

14. The optical waveguide collector element of claim 12, wherein the material comprises acrylic.

15. The optical waveguide collector element of claim 12, wherein the input face, output face and convex surfaces of the collector element form interfaces between the material and air surrounding the collector element.

16. A distributed lighting system including the optical waveguide collector element of claim 12, the distributed lighting system further comprising a light source in proximity to the input face of the collector element.

17. An optical waveguide bend element configured to change a direction of travel of light from a first direction to a second direction, comprising a block of material having:

an input face configured to receive light travelling in the first direction;

an output face configured to transmit light travelling in the second direction, the second direction being substantially different from the first direction;

a portion that is substantially bypassed by light passing through the bend element;

a mounting fixture attached to the portion that is substantially bypassed by light passing through the bend element; and a convex surface defined between the input face and the output face;

wherein the convex surface is configured to keep the light within the bend element through total internal reflection, and the input face, output face and convex surface form interfaces between the material and air surrounding the bend element.

18. The optical waveguide bend element of claim 17, wherein the material comprises acrylic.

19. The optical waveguide bend element of claim 17, wherein the input face is substantially perpendicular to the output face.

20. The optical waveguide bend element of claim 17, wherein the convex surface comprises a plurality of bevelled surfaces.

21. An optical waveguide bend element configured to change a direction of travel of light from a first direction to a second direction, comprising a block of material having:

an input face configured to receive light travelling in the first direction, an output face configured to transmit light travelling in the second direction, the second direction being substantially different from the first direction, a first curved surface defined between the input face and the output face, wherein the first curved surface is configured to keep the light within the bend element through total internal reflection, and a second curved surface defined between the input face and the output face, wherein the second curved surface is configured to keep the light within the bend element through total internal reflection, wherein a radius of curvature of the first surface is greater than a radius of curvature of the second surface.

22. The optical waveguide bend element of claim 21, wherein a center of curvature of the first curved surface is offset from a center of curvature of the second curved surface.

23. A distributed lighting system including the optical waveguide bend element of claim 1, the system further comprising an optical waveguide collector element configured to concentrate light from a light source, the optical waveguide collector element comprising a block of material having:

an input face configured to receive light from a light source, and an output face configured to transmit light, wherein the output face subtends an azimuthal angle relative to the light source that is smaller than an azimuth angle subtended by the input face.

* * * * *